United States Patent
Ranney

(10) Patent No.: US 10,109,028 B2
(45) Date of Patent: Oct. 23, 2018

(54) EMBEDDABLE COMMUNICATIONS SOFTWARE MODULE

(71) Applicant: VOXER IP LLC, San Francisco, CA (US)

(72) Inventor: Matthew J. Ranney, Oakland, CA (US)

(73) Assignee: VOXER IP LLC, San Francisco, CA (US)

( * ) Notice: Subject to any disclaimer, the term of this patent is extended or adjusted under 35 U.S.C. 154(b) by 901 days.

(21) Appl. No.: 14/597,153

(22) Filed: Jan. 14, 2015

(65) Prior Publication Data

US 2015/0302540 A1 Oct. 22, 2015

Related U.S. Application Data

(60) Provisional application No. 61/980,166, filed on Apr. 16, 2014.

(51) Int. Cl.
*G06F 15/16* (2006.01)
*G06Q 50/30* (2012.01)
*H04L 12/58* (2006.01)

(52) U.S. Cl.
CPC ............. *G06Q 50/30* (2013.01); *H04L 51/04* (2013.01); *H04L 51/14* (2013.01)

(58) Field of Classification Search
CPC ................................ H04L 51/04; G06Q 50/30
USPC ................................................. 709/207, 203
See application file for complete search history.

(56) References Cited

U.S. PATENT DOCUMENTS

| | | | |
|---|---|---|---|
| 2005/0243974 A1* | 11/2005 | Pearson | H04M 11/04 379/37 |
| 2006/0095332 A1* | 5/2006 | Riemann | G06Q 20/203 705/22 |
| 2009/0103521 A1* | 4/2009 | Katis | H04L 51/04 370/352 |
| 2009/0327422 A1* | 12/2009 | Katis | H04L 12/1827 709/204 |
| 2011/0099040 A1* | 4/2011 | Felt | G06F 17/3087 705/7.12 |
| 2012/0041675 A1* | 2/2012 | Juliver | G06Q 10/08 701/465 |
| 2016/0294965 A1* | 10/2016 | Mei | H04W 4/12 |

OTHER PUBLICATIONS

"Skype development," Microsoft Developer Network, URL: https://msdn.microsoft.com/en-us/en%C2%ADus/library/office/dn745878, updated Jun. 2, 2014, 4 pages.

* cited by examiner

*Primary Examiner* — Duyen M Doan
(74) *Attorney, Agent, or Firm* — Beyer Law Group LLP

(57) ABSTRACT

One aspect of the invention pertains to an embeddable software communications module. The module provides an application programming interface (API) that allows the module to receive API inputs from a software application. In various implementations, the module is arranged to progressively receive, transmit and/or store messages. In some embodiments, the module allows rendering of a received message in a real time mode or time-shifted modes and allow a user to easily transition between the two modes.

16 Claims, 6 Drawing Sheets

EMBEDDABLE COMMUNICATIONS SOFTWARE MODULE

CROSS-REFERENCE TO RELATED APPLICATIONS

The present invention claims priority to U.S. Provisional Patent Application No. 61/980,166, entitled "Embeddable Communications Software Module," filed Apr. 16, 2014, which is hereby incorporated by reference in its entirety for all purposes.

FIELD OF THE INVENTION

The present invention pertains to communications, and more particularly, to an communications software module that can be embedded in other software applications.

BACKGROUND OF THE INVENTION

There are a wide variety of communication services available for use on mobile and computer devices. Some services, such as Skype™, allow a user to talk in real time with another user, similar to a conventional phone call. Other services, such as WhatsApp™ or Line™, allow a user to send text messages, video or images to their friends and contacts.

Typically, users will access the above communication services by using a dedicated application. For example, a user of Skype could install a dedicated Skype client on his or her mobile device or computer. The client provides a variety of features, such as the ability to register an account, identify contacts and friends, and make a call.

Some communication service companies have made an effort to allow third party developers to access to their communication networks. This allows third parties to access feature-rich communication applications without going through the time and expense of creating their own. For instance, consider an example of a retail outlet that markets its products on a website. It may be desirable to allow a user who visits the website to quickly and easily make a call through his or her computer to a customer service representative at the retail outlet.

Various companies such as Skype™ have made it fairly easily to integrate their services into such a website. Skype provides hyperlinks on its developer website that a third party developer may insert into his or her HTML code. In some implementations, the hyperlink generates a button at the website. If the button is clicked by a user of a computer, the computer will make a call to a designated recipient (e.g., a customer service representative at the retail outlet.) To make the call, a Skype dedicated client must already be installed on the computer. That is, the pressing of the button launches the Skype client that is already resident on the computer. The client is then used to make the call.

SUMMARY OF THE INVENTION

The present invention relates to an embeddable communications software module. More specifically, the present invention involves a module that can be embedded in a software application, which provides the application with various communications features.

In one aspect, an embeddable communications software module will be described. The module provides an application programming interface (API) that allows the module to receive API inputs from a software application. The API is arranged to receive and process a wide variety of inputs, commands and calls from the software application, depending on the needs of a particular application. The module also is arranged to provide various types of notifications and data to the software application. In various embodiments, for example, the module receives recipient identity information from the software application. The recipient identity information helps indicate an identity of a message recipient. The module is arranged to record outgoing media created by a user (e.g. by recording an audio message using a microphone.) The outgoing media is progressively transmitted to an external communications device while the outgoing media is being created by the user. The recipient of the message is identified using the recipient identity information received from the software application. The outgoing media is also progressively stored while the outgoing media is being created and transmitted.

In another aspect, the module is arranged to receive an incoming message behavior policy from the software application. The incoming message behavior policy indicates how the embeddable communications software module responds to incoming messages. An incoming message is received from an external communications device. The incoming message is progressively stored as it is received. In response to the received message, the module sends a notification to the software application based on the incoming message behavior policy. The module is arranged to selectively render the incoming message in a real time mode or a time shifted mode. In the real time mode, the incoming message is progressively rendered in (near) real time as it is received. In the time-shifted mode, the incoming message is rendered after the incoming messages is received and stored. The mode that the message is rendered in is based at least in part on the incoming message behavior policy received from the software application.

BRIEF DESCRIPTION OF THE DRAWINGS

The invention and the advantages thereof, may best be understood by reference to the following description taken in conjunction with the accompanying drawings in which.

DETAILED DESCRIPTION OF THE PREFERRED EMBODIMENTS

The present invention relates generally to communications. In particular, the present application pertains to an embeddable software communications module. The module can be embedded in a wide variety of software applications. Various implementations of the module allow the software application to access a novel type of telecommunications and media management system, which has been described in multiple, co-assigned patent applications, including U.S. patent application Ser. No. 13/55,034 (hereinafter referred to as the '034 application), which is incorporated herein by reference in its entirety for all purposes.

Various implementations of this system involve store and forward, progressive messaging. Some implementations may be described as follows. A computing device (e.g., a smartphone, a computer, or any other suitable computing device) includes a software application that receives a message (e.g., an incoming voice call) and progressively stores the message while it is being received. When a user is sending a message (e.g., an outgoing voice call), the device also progressively transmits and stores the message while it is being created. In some implementations, the stored messages are threaded to form a message history for a conversation between a user of the device and one or more other participants. This storage feature enables two modes of operation for the user, a real time mode and a time-shifted mode. In the real time mode, a user of the device can receive and listen to calls in (near) real time, similar to an ordinary cell phone. That is, the incoming message is progressively rendered as it is being progressively stored and received. In the time-shifted mode, the user can selectively render and review any stored messages. In various implementations, the application allows the user to seamlessly switch between the two modes at any time.

Some or all of the above functionality can be accessed using dedicated communications software applications e.g., a Voxer® mobile application. However, it would be desirable to find a way to easily integrate the above functionality into third party applications. This would allow third parties to integrate advanced communications features into their applications, while reducing development time and eliminating the need to invest in a network infrastructure. This application describes various implementations of a communications software module that can be easily embedded in a wide variety of software applications and platforms.

Figure 1:
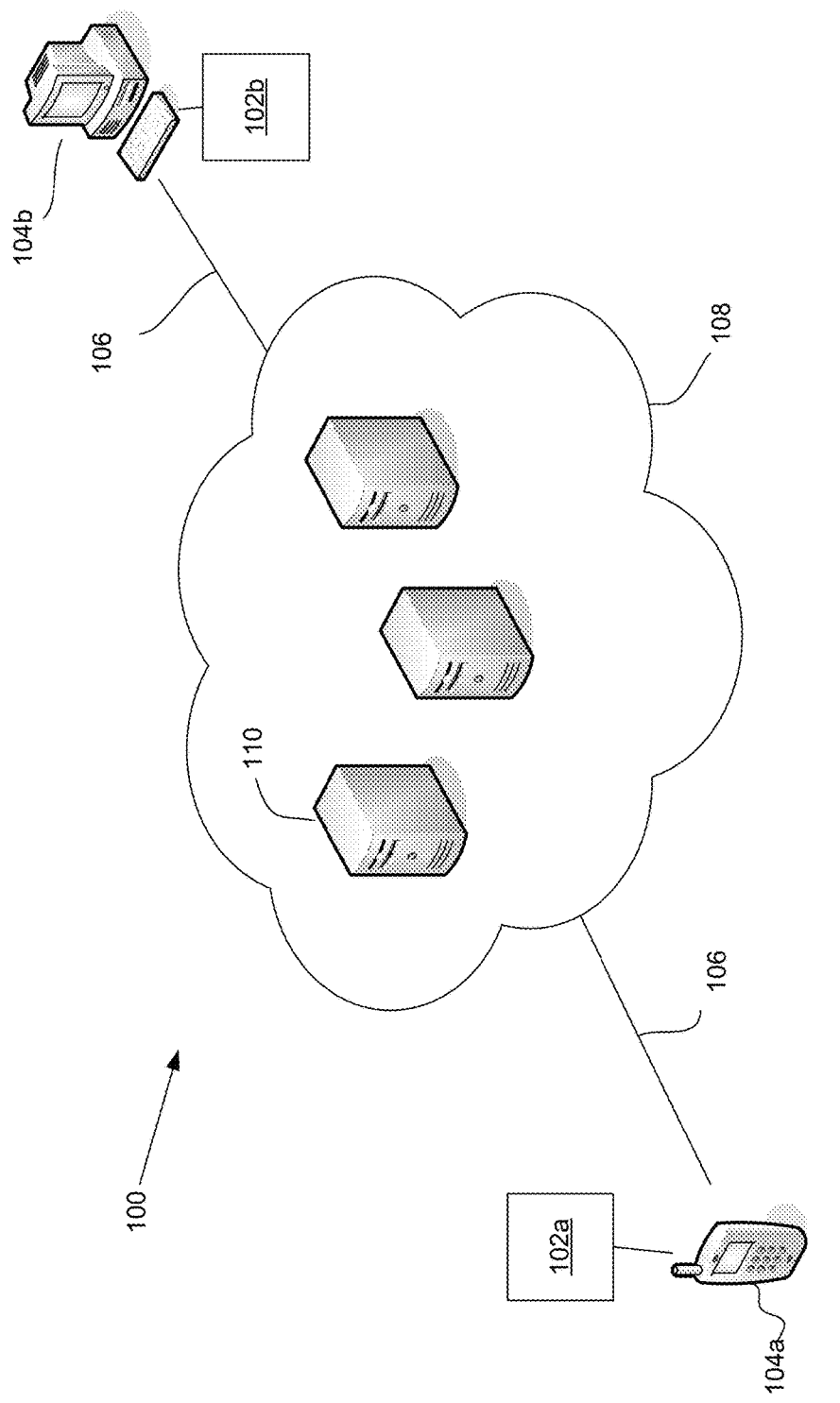
FIG. 1 is a diagram of a telecommunications and media management system according to a particular embodiment of the present invention.

Referring initially to FIG. 1, a block diagram of a telecommunication and media management system 100 according to one embodiment of the present invention is shown. The system 100 includes software applications 102a/102b that run on computing devices 104a/104b. In this example, a company that developed the software applications 102a/102b wishes to enable users of its applications to communicate with one another over the Internet. However, the company does not own or operate a service that would enable such communication. As a result, the company has embedded an embeddable software communications software module (not shown) into its software applications. The module allows the devices 104a/104b and software applications 102a/102b to access the telecommunication and media management system 100. Typically, the embeddable software communications module is developed by a different company or entity (e.g., the assignee of the present application), which helps to manage and operate the system 100.

The computing devices 104a/104b use the embedded module and the system 100 to communicate with one another through one or more networks 106 that connect the devices 104a/104b to a communication services network 108. The communications services network 108 includes servers 110. In various embodiments, the networks 106 may be the Public Switched Telephone Network (PSTN), a cellular network based on CDMA or GSM or any other suitable protocol, the Internet, a tactical radio network or any other communication network.

In this example, device 104a is sending a message or media stream to device 104b. For example, a camera, microphone or other media capturing tool on the device 104a may be used to obtain video, sound or images. The embeddable communications software module stored on the device 104a then streams (e.g., progressively creates and transmits at the same time) the created media to the device 104b. The software application 102b on device 104b also incorporates an embeddable communications software module, which receives and processes the message. The generation, sending, storage and receiving of the media may be performed in a wide variety of ways. For example, the software applications 102a/102b and devices 104a/104b may communicate in any manner described in the '034 application. In the illustrated embodiment, the media is also streamed through one or more servers 110, which in turn store the media and stream it to the device 104b for rendering.

The devices 104a and 104b each may be any suitable device that is capable of transmitting and/or receiving messages over the network 108. In various implementations, the device 104a/104b includes but is not limited to a computer, a smartphone, a laptop, a tablet, a smartwatch and smart glasses.

Figure 2A:
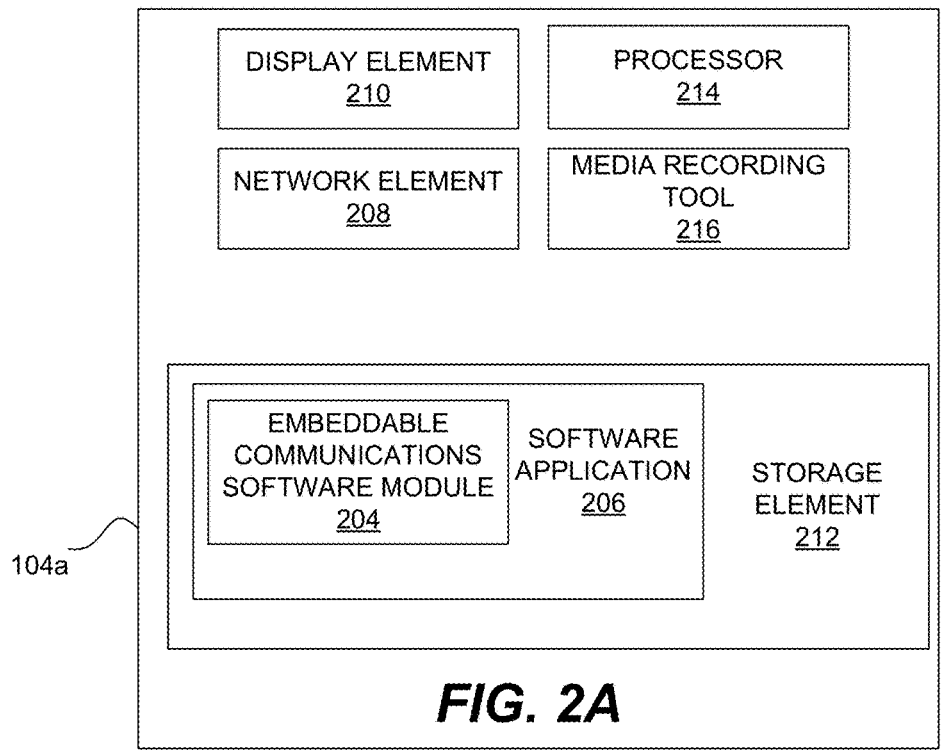
FIG. 2A is a block diagram of a device with an embeddable communications software module according to a particular embodiment of the present invention.

Referring next to FIG. 2A, a block diagram of a device 104a according to a particular embodiment of the present invention will be described. The device 104a includes a network element 208, a storage element 212, a processor 214, a media recording tool 216 and a display element 210. The illustrated device may be device 104a or 104b of FIG. 1.

The network element 208 is any software and hardware (e.g., antenna, network connection software, etc.) suitable for connecting the device 104a with the networks 106 and 108 and the device 104b. The storage element 212 is any computer readable storage medium, hardware or software suitable for storing media, software code or computer programs, including but not limited to a tangible forms of computer readable mediums such as a hard drive, flash drive, volatile memory, non-volatile memory or some combination thereof. The storage element 212 includes a software application 206. The software application 206 incorporates an embeddable communications software module 204.

The software application 206 may be any suitable executable program. In various embodiments, the software application 206 is arranged to provide a user interface and options that a user can interact with to activate particular features. Some of these features may have nothing to do with network communications, but instead serve other purposes, such as user registration and authentication, marketing, data management, etc.

Embedded within the software application is an embeddable communications software module 204. The embeddable communication software module 204 is a distinct software module that manages some or all of the aforementioned communications features (e.g., some or all of the store and forward, progressive messaging functionality described above or any feature described in the '034 application.) The module 204 may be precompiled software, source code and/or any suitable type of software.

Due to the module, the software application 204 need not directly manage network communications. Instead, the software application can send commands to the module 204, which causes the module 204 to send, receive, process or manage messages in accordance with the commands. From a developer standpoint, the incorporation of the module is highly advantageous. The developer of the software application 206 need not spend time or resources on developing a proprietary communications solution, but instead can offload such functionality to the module 204, which is typically provided by another developer.

Figure 2B:
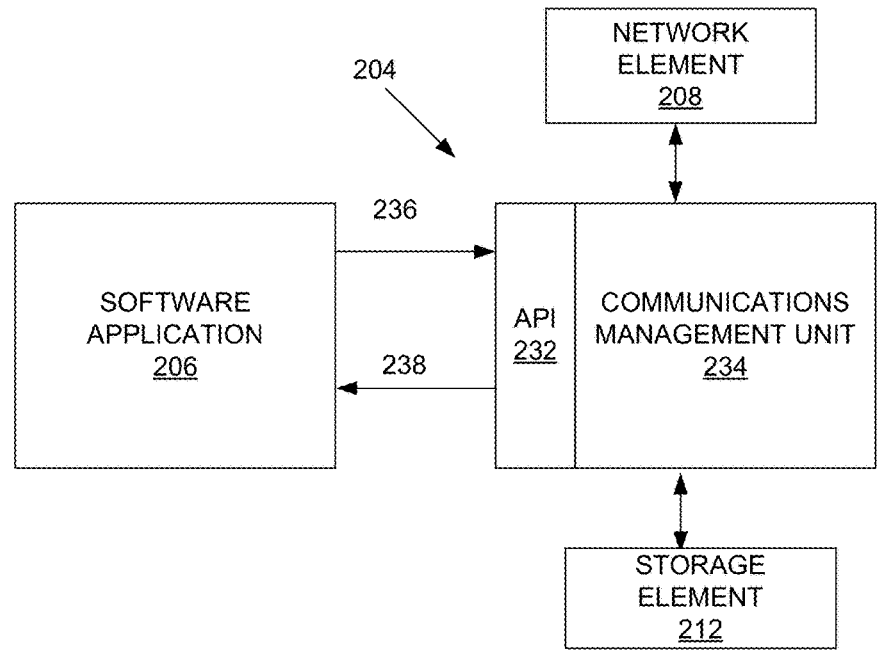
FIG. 2B is a block diagram illustrating a software application and an embeddable communications software module according to a particular embodiment of the present invention.

An example interaction between the software application 206, the embedded communications software module 204 and the device 104a will be described with reference to the block diagram illustrated in FIG. 2B. The module 204 includes an application programming interface (API) 230 and a communications management unit 232.

The API is arranged to receive API inputs, commands or calls from the software application 206. The API may be arranged to accept and process a wide variety of commands. In various embodiments, for example, the software application 206 can send an API command 236 to identify the recipient of the message or to adjust the manner in which the module 206 alerts the software application of incoming messages or new developments. In various implementations, the module 206 responds to the API command 236 by taking a particular action or by providing data or a notification 238.

The communications management unit 232 of the module 204 is arranged to process and execute any received API commands or instructions. Any action or feature that is provided by the embeddable communications software module 204 is enabled through the communications management unit 232. The communications management unit 232 is also arranged to operate components of the device 104a based on the API commands and generally manages any interaction between the device 104a and the rest of the telecommunications and media system 100 of FIG. 1. For instance, if an API command is received indicating that a message is being created and should be sent to a particular recipient device, the communications management unit 232 instructs the network element 208 of the device 104b to progressively transmit the created message to the recipient device as the message is being created. At the same time, the communications management unit 232 instructs the storage element 212 to store the created message as it is being created and transmitted.

Returning again to FIG. 2A, the device 104a further includes a processor 214, a display element 210 and a media recording tool 216. The processor 214 is arranged to execute any computer code stored in the storage element 212, such as computer code for the software application 206 or the module 204. The execution of such code can cause the device 104a, software application 206 and/or embeddable module 204 to perform any of the methods described in this application (e.g., the methods 300 and 400 of FIGS. 3 and 4). The display element 210 is arranged to generate or display media or a user interface (e.g., the user interfaces 500 and 600 of FIGS. 5 and 6.) The display element 210 may include but is not limited to an LCD screen, an electronic screen, a video display screen, a touch-sensitive capacitive screen, an electronic paper display or any other known display technology. The media recording tool 216 is any hardware or software suitable for creating media that can be sent in the form of a message. In some implementations, the media recording tool 216 includes a camera and/or a microphone.

Figure 3:
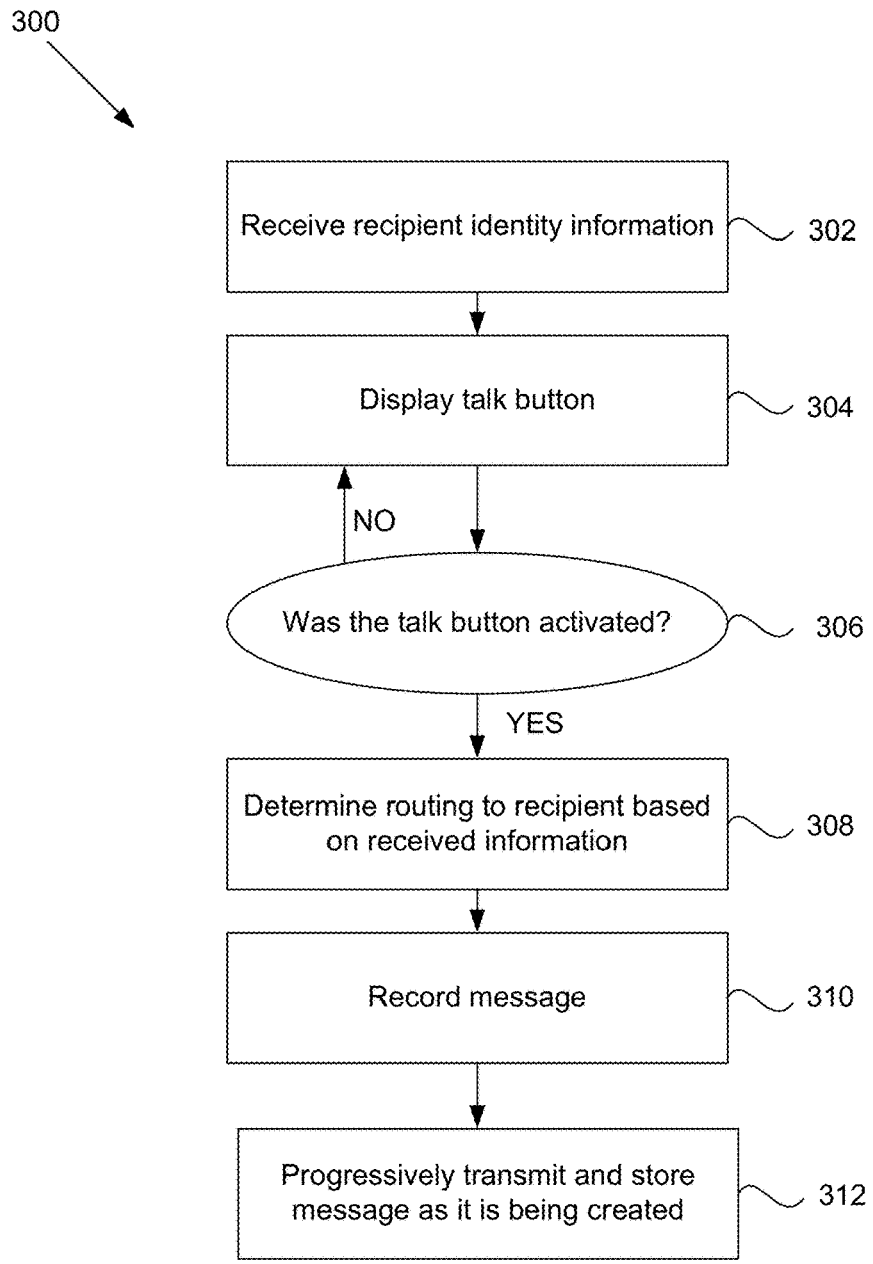
FIG. 3 is a flow diagram illustrating a method for transmitting a message using an embeddable communications software module according to a particular embodiment of the present invention.

Device 104a, whose components are described above, is able to transmit messages to and/or receive messages from another device (e.g., device 104b of FIG. 1) using the aforementioned embeddable communications software module 204. Referring next to FIG. 3, an example method 300 for transmitting such messages using the embeddable module 204 according to another embodiment of the present invention is described.

Initially, at step 302, the embeddable communications software module 204 receives input from the software application 206. The input may be any suitable type of command, call or instructions for the module 204. In the illustrated embodiment, for example, the input is recipient identity information that is received using the API 232. The recipient identity information indicates a recipient for a message. In various embodiments, the recipient identity information provides an address for a recipient or an identification value that is used to determine which user or account of a communications service should receive the message. Generally, any information that is used to help route the message to its intended recipient can be part of the recipient identity information.

At step 304, a talk button is optionally displayed on a user interface of the device 104a. The interface is displayed on a video screen or display element 210 of the device 104a. In various embodiments, most of the interface is generated by the software application 206 and the talk button is generated by the embeddable communications software module 204. In still other embodiments, the interface is entirely generated by the software application 206 and the module 204 enables the functionality behind one or more of the buttons.

Figure 5:
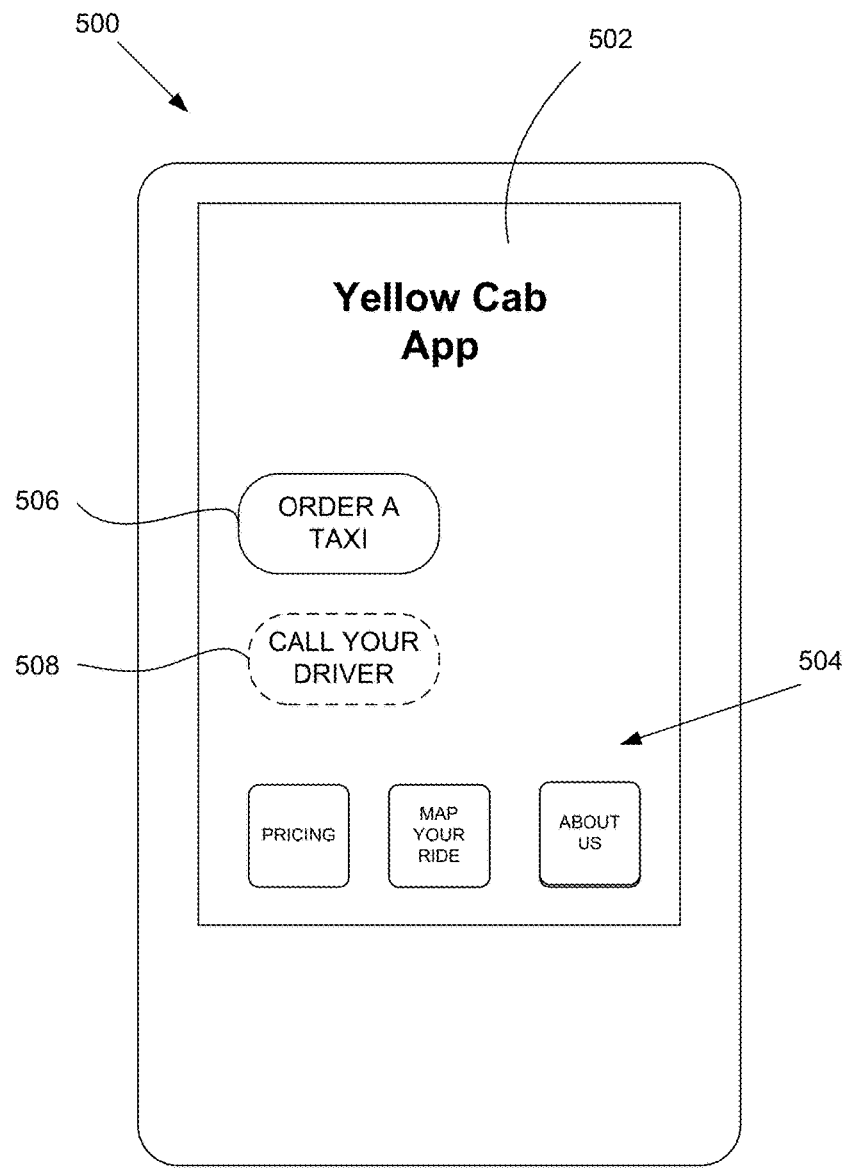
FIG. 5 is a block diagram illustrating an example device and an example user interface for a taxi software application according to a particular embodiment of the present invention.

An example implementation of the above features is illustrated in FIG. 5. FIG. 5 illustrates a device 500, which may be any computing suitable device (e.g., device 104a/104b of FIGS. 1 and 2). In this particular example, the device 104a is a smartphone with a touch-sensitive display element 210 or screen. The device 500 is currently running a taxi mobile application, which was developed by a taxi company ("Yellow Cab.") The mobile application displays a user interface 502 with various buttons 504. The buttons 504 allow a user to access a variety of features, including pricing information, a map of nearby taxis, and information about the tax company.

The Yellow Cab software application 206 also provides two talk buttons (step 304) on the user interface 502. The first talk button 506, labeled "Order a Taxi," allows a user to contact a dispatcher at the taxi company to arrange a cab ride. After a taxi has been ordered, the second talk button 508, labeled "Call your Driver," appears on the user interface 502. The second talk button 508 allows the user to contact the driver that is coming to pick up the user. For example, the user might activate the second talk button to ask a driver about a delay or to inform the driver that more time is needed before the pickup occurs.

The embeddable communications software module 204 handles the communications functionality for the two talk buttons 506/508. In some embodiments, the module also helps generate the graphics for the talk buttons 506/508, which are positioned within the interface generated by the software application. The software application 206 transmits recipient identity information (step 302) to the module, indicating the recipients of any messages sent in response to the activation of the first and second talk buttons 506/508. In this example, the recipient identity information for the first and second talk buttons involve information used to route a message to the taxi dispatcher and the taxi driver, respectively.

In some embodiments, the software application 206 sends new recipient identity information periodically (step 302) to the embedded module 204. In the illustrated embodiment of FIG. 5, for example, the taxi software application 206 periodically sends a request for new dispatcher identity information over the Internet to a server operated by the taxi service. The server is aware of which dispatchers are available or busy at any given time. The server thus routinely provides new dispatcher identity information to the taxi software application 206. This information involves any information that helps identify a dispatcher at the tax service, such as data that identifies an online account for the dispatcher or an address for the dispatcher. The taxi application then provides this data, in the form of recipient identity information (step 402), to the module 204. Thus, when a talk button is activated, the message is routed to an appropriate dispatcher using the recipient identity information (e.g., to the dispatcher who is most available and/or has the lowest call volume.)

Returning to method 300 of FIG. 3, at step 306 a determination is made as to whether a talk button was activated. If the talk button was not pressed or activated, then the module continues to wait for user input and the method returns to steps 302 and/or 304.

If the talk button is activated, the module 304 determines the routing for the message. The routing is based on the recipient identity information obtained in step 302. Additional operations may be necessary to prepare for the routing of the message. In some embodiments, for example, the recipient identity information is associated with a particular user account for a communication service. The module 204 then transmits a request for routing information relating to the designated user account to a server operated by the communication service. The server determines address or other routing information for the user account. The server then provides this routing information to the module 204, which then uses the routing information to discover a suitable delivery path and transmit the message.

At step 310, the user of the device 104a records a message using a media recording tool 216. For example, a microphone or camera may be automatically activated and placed in a record mode in response to the activation of the talk button. The outgoing message may involve any suitable type of media, including voice, pictures, text messages or movies. The software application 206 or the module 204 may handle the activation of the media recording tool 216 and the obtaining of the media. In the former case, the software application 206 would then provide the obtained media to the module 204.

The module 204 then progressively transmit or routes the message based at least in part on the recipient identity information as the message is being created by the user (step 312). Additionally, the module progressively stores the media at a storage element 212 as it is being created and transmitted.

Figure 4:
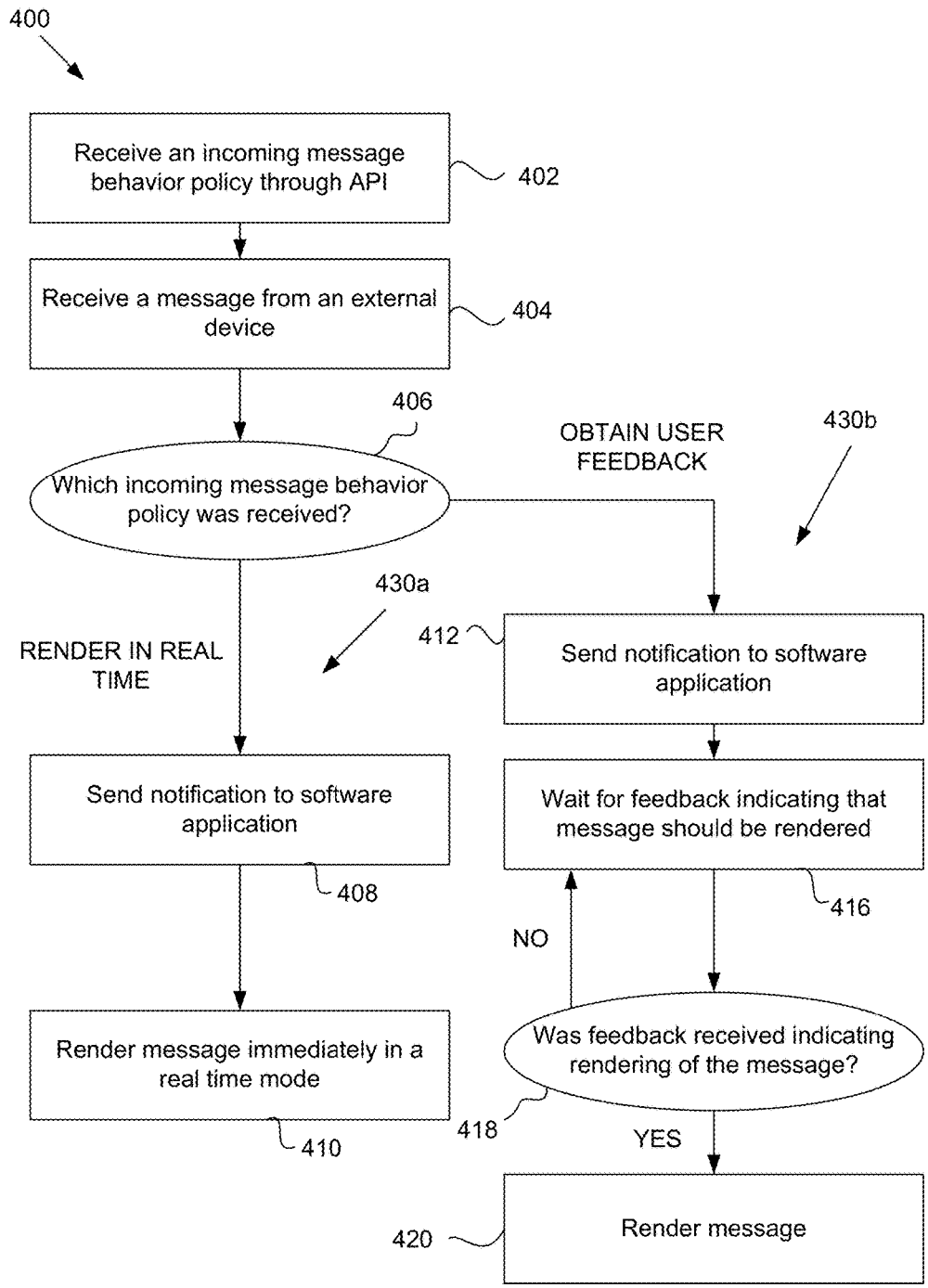
FIG. 4 is a flow diagram illustrating a method for handling a received message using an embeddable communication software module according to a particular embodiment of the present invention.

Referring next to FIG. 4, an example method 400 for receiving a message using an embeddable communications software module will be described. In various embodiments, the module that performs method 400 is the same as the module 204 that performed the aforementioned method 300 of FIG. 3. In other embodiments, the module that performs method 400 is receiving a message from the module that performed the aforementioned method 300 to transmit the message. The method 400 may be performed by either device 104a or 104b in the telecommunications and media management system 100 illustrated in FIG. 1. In this example, it is assumed that the device that is implementing method 400 is device 104a of FIGS. 1 and 2, which includes a software application 206 with an embeddable communications software module 204.

Initially, at step 402, an incoming message behavior policy is received at the embeddable communications software module 204 from the software application 206. The incoming message behavior policy provides instructions to the module using the API 232, indicating how the module 204 should respond to new, incoming messages. For example, one type of incoming message behavior policy might instruct the module 204 to not play any incoming messages in a real time mode, but instead store them all for later rendering. Another type of policy might indicate that the module 204 should immediately start progressively storing messages as they are received, and prompt a user to select a message for real time mode rendering. There are a wide variety of possible incoming message behavior policies, some of which will be discussed in greater detail below.

At step 404, the embeddable communications software module 204 receives a message from an external device 104b. In the context of the example illustrated in FIG. 1, a user of device 104a is creating a message (e.g., speaking into a microphone on device 104a) and progressively transmitting it to the device 104b, where it is received by the embeddable communications software module 204 at device 104b.

At step 406, the module 204 determines which incoming message behavior policy was received. The module 204 then performs operations based on the incoming message behavior policy received from the software application 206. Method 300 illustrates two sets of operations: operations 430a, which includes steps 408 and 410; and operations 430b, which includes steps 412, 416, 418 and 420. Depending on the incoming message behavior policy received at step 402, the embeddable communications software module 204 performs a different set of operations.

The operations 430a/430b required by a particular incoming message behavior policy may vary widely. A few example incoming message behavior policies and the operations that they require are provided below:

1. RENDER IN REAL TIME—This policy indicates that the embeddable communications software module 204 should immediately render received messages in (near) real time. That is, an incoming message should be progressively rendered as it is received and/or stored. This real time rendering option may be conditioned on connectivity. If connectivity is poor, the incoming message may instead be progressively stored as it is received. This policy can work well, for example, in situations in which the device 104a should have a push-to-talk-like functionality.

2. RENDER/STORE BASED ON PRIORITY—In some embodiments, incoming messages are each assigned a priority. This works well in situations in which various incoming messages are expected to arrive, in which some are clearly more important or urgent to hear than others. Thus, in some approaches, the module 204 immediately renders incoming messages that have a high priority in a real time mode, even if the rendering of another, lower priority message is ongoing. The lower priority message is then progressively stored as it is received so that it can be accessed later. The priority value assigned to a message may be based on a wide variety of factors, including but not limited to the identity of the sender.

3. STORE NEW MESSAGES—This policy indicates that when new messages arrive, the module 204 should progressively store them as they are received. Incoming messages are not immediately rendered in real time as they are received. Generally, the module 204 also sends a notification to the software application 206, indicating that a new message has arrived and is being stored. Some implementations allow the user to transition at any time to a real time mode and progressively render the incoming message. This functionality is useful when the user has indicated that he or she is busy and does not wish to defer any calls until later.

4. REJECT DESIGNATED MESSAGES—According to this policy, when a message arrives, it is selectively not rendered and/or not stored, depending on designated characteristics of the message (e.g., the identity of the sender, the priority assigned to the sender, etc.) This policy is suitable for situations in which the device user or software application only wishes to handle messages from predetermined, approved sources.

5. OBTAIN USER FEEDBACK ON MESSAGE—According to this policy, when a message arrives, the module 204 should immediately send a notification to software application 206 and await further feedback from the user and/or the software application 206. In various embodiments, the feedback includes a command to either play the message in a real time mode, or to simply continue storing the message so that it can be rendered afterward. In some implementations, the module 204 also provides a mechanism for obtaining the feedback (e.g., displays an inquiry or button on the display element 210). In other implementations, the module 204 leaves the generation of such buttons to the software application 206. This policy works well in a situation in which the device user wishes to have an option to take a call immediately, or to defer that decision until later, similar to a typical cell phone call.

6. PROVIDE NOTIFICATON—This policy requires that the module 204 notify the software application 206 that a message has arrived. Typically, this policy is combined with another policy. For example, if the above policy 4 ("REJECT DESIGNATED MESSAGES") is provided to the module 204, it may also be combined with a requirement that the module 204 notify the software application 206 of the rejected messages and/or their senders. The notification from the module 204 may include any type of information related to the incoming message. This information includes and is not limited to the sender identity, the size or length of the message, the priority assigned to the message, the geographical location that the message originated from, the time that the message was sent or received and the time that the message ended. The software application 206 may then process or utilize this information as appropriate.

7. REPLY TO SENDER—This policy requires that the module 204 generate and transit a response to the device that is sending the message. In some embodiments, for example, the response involves the module 204 generating a sound (e.g., a ring tone) or an automated message for the user of the sending device to hear.

The above list is intended to be exemplary and not limiting in any way. It should be appreciated that the embeddable communication software module 204 is arranged to receive, handle and execute a wide variety of different incoming message behavior policies, depending on the needs of a particular application. In some implementations, for example, the module 204 receives and implements a policy that involves a combination of the aforementioned features. To use a simple example, a message behavior policy could involve 1) accepting messages only from preapproved sources and not receiving or storing others; 2) sending a notification to the software application indicating that a new message has arrived from an approved source; 3) waiting for feedback from the software application and/or the user to determine whether to play the message in real time. Such a policy includes aspects of policies 4, 5 and 6 above.

In the example illustrated in method 400, only two incoming message behavior policies are contemplated, RENDER IN REAL TIME and OBTAIN USER FEEDBACK. Of course, in a typical implementation, the module 204 is able to receive and execute a much larger number of policies.

In the illustrated embodiment, if the RENDER IN REAL TIME policy was received, then operations 430*a* (i.e., steps 408 and 410) are performed. The module 204 sends a notification to the software application 206 indicating that a new message has arrived and/or that the new message will be rendered immediately (step 408). At step 410, the message is progressively rendered as it is received from the device 104*a*.

If the incoming message behavior policy received in step 402 was OBTAIN USER FEEDBACK ON MESSAGE, then operations 430*b* (i.e., steps 412, 416, 418 and 420) are performed. The module 204 sends a notification to the software application 206 (step 412), indicating that a new message has arrived and that further feedback from the software application 206 or the user is required to render the message. In some embodiments, the module 204 generates a sound (e.g., a ringtone) to alert a user of the message. In still other embodiments, the module 204 can display a button or another option to the user on the display element 210 of the device 104*b*. The activation of the button will allow the user to render the message in a real time mode.

At step 416, the module 204 waits for feedback from the user and/or software application 206. In various embodiments, while it is waiting, the module 204 progressively stores the incoming message as it is being received. At step 418, a determination is made as to whether feedback was received, indicating that the incoming message should be rendered. If not, the module continues to wait for feedback (step 416). If so, then the module progressively renders and stores the incoming message as it is received (step 420).

Figure 6:
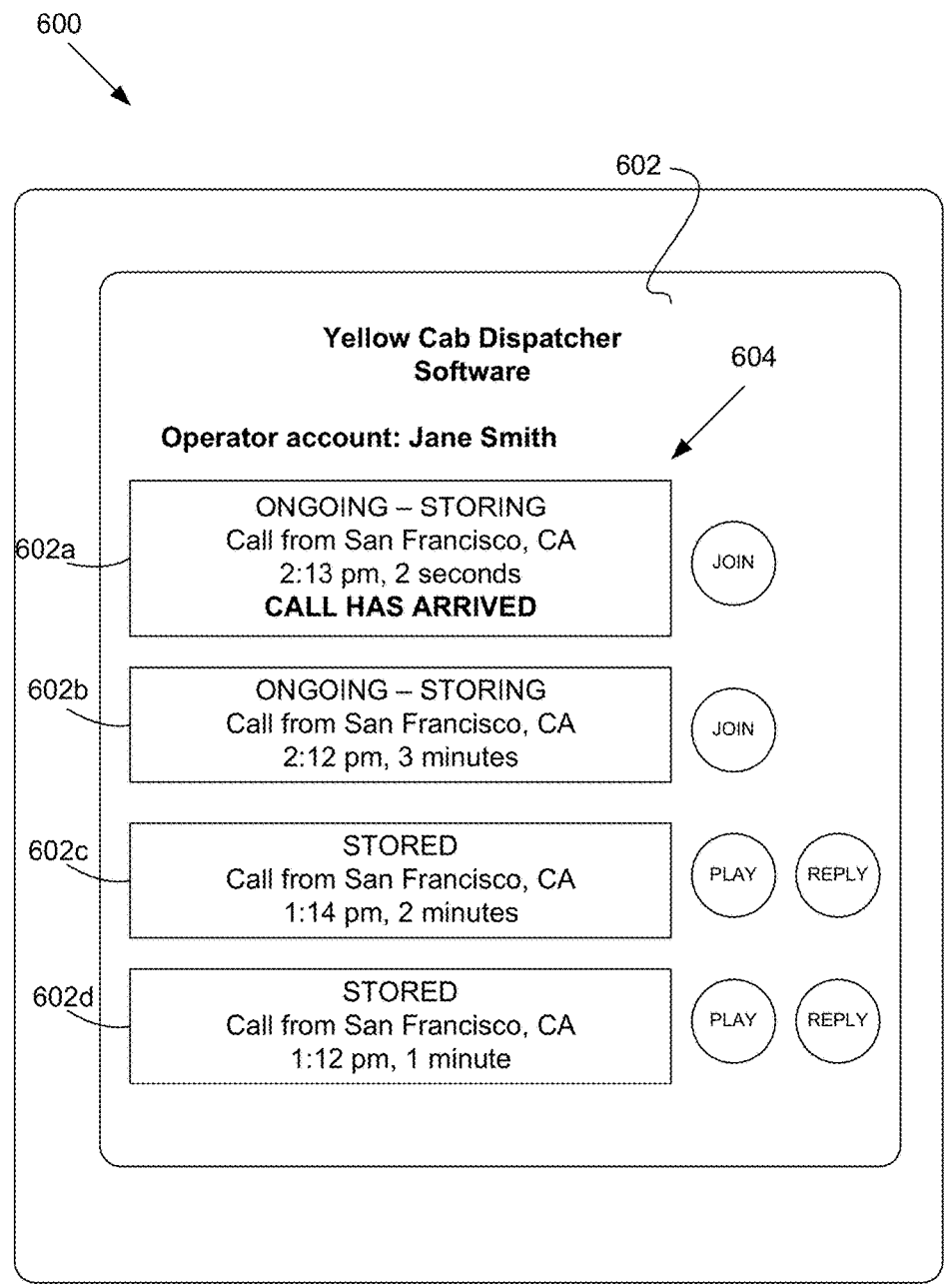
FIG. 6 is a block diagram illustrating an example dispatcher device and an example user interface for a taxi dispatcher software application according to a particular embodiment of the present invention.

Referring next to FIG. 6, an example dispatcher device 600 that is configured to implement the aforementioned method 400 will be described. In this example, the dispatcher device 600 is receiving a message from the device 500 in FIG. 5 that is running a taxi application. That is, the taxi application of the device 500 is being used to call a dispatcher to arrange a pickup by a taxi, as previously discussed. A dispatcher at a taxi company then uses the illustrated dispatcher device 600 to receive and handle the incoming message.

The dispatcher device 600 may be any suitable device, including a personal computer, a laptop, a smartphone or any other computing device. In the illustrated embodiment, the dispatcher device 600 is a computer running the Windows Operating System, although of course any suitable operating system or software may be used. The dispatcher device 600 may include any component or feature described in connection with device 104*a* of FIG. 2. In the illustrated embodiment, the dispatcher device 600 includes a display element 210 (e.g., a connected monitor), which displays a user interface 602.

The taxi company has installed a dispatcher software application 206 on the dispatcher device 600. The dispatcher software application provides a variety of helpful features to a dispatcher. Most or all of the communications functionality for the application, however, is handled by an embeddable communications software module 204. The module 204 is embedded in the dispatcher software application 206. The dispatcher software application 206 provides API commands or instructions to the module 204, which the module 204 uses to manage the transmission, reception, rendering and storage of messages. In this example, a communications company, which is separate from the taxi company, developed the module 204 and maintains the communications infrastructure that the module 204 uses.

The user interface 602 is generated by the software application 204. In this particular example, the user interface 602 identifies the dispatcher (i.e., Jane Smith) that is currently using the software.

The user interface 602 displays a message history 604. In various embodiments, the message history 604 is at least partly or (almost) completely generated by the module 204, although this is not a requirement. The message history 604 indicates a history of incoming and/or outgoing messages. In this particular example, a list of incoming messages is provided. For each message, the duration of the message, the location from which the message originated and the time of the message is displayed. Other information may also be provided, such as the identity of the sender, whether a message has been addressed and dealt with, whether a taxi was sent out to pick up the caller, etc. The user interface also indicates the status of each message (stored, ongoing, etc.) and provides options for rendering a message or calling back a sender of a message.

In this example, there are two messages (marked by message indicators 602c/602d) that have been stored and have already ended. There also two messages (marked by message indicators 602a/602b) that are currently being received. As they are being received, they are being stored at a storage element 212 in the dispatcher device 600. At any time, the dispatcher can transition between real time and time shifted modes. For example, the dispatcher can press a "play" button for message indicators 602c and 602d at any time to play the corresponding previously stored message; alternatively, the dispatcher can press the "join" button for message indicators 602a and 602b to listen to either of the corresponding messages in a real time mode. The dispatcher can switch seamlessly between messages and modes.

The module 204 is arranged to provide the aforementioned message history 604 and message management options to assist the dispatcher in organizing and responding to calls. Of course, the actual user interface may differ substantially in different implementations. It should further be appreciated that the above interface is not limited to just the receiving device or device 104b. That is, the embeddable communications software module in the sending device (e.g., device 500 of FIG. 5) may also be arranged to provide a message history of incoming and/or outgoing calls with similar or identical features. This would allow the taxi customer to see when a dispatcher or taxi driver has tried to get in touch with him or her, and to respond in real time or in a time shifted mode as appropriate.

The embeddable communications software module 204 in the dispatcher device 600 is arranged to perform the steps of method 400 of FIG. 4. That is, the dispatcher device 600 and/or the module 204 is arranged to receive a message e.g., from the taxi software application described in connection with FIG. 5 (step 404). The dispatcher software application in the device 600 provides an incoming message behavior policy to its embedded module 204 (step 402), which indicates how the module 204 should handle new messages.

In the illustrated embodiment, the incoming message behavior policy is intended to help assist the dispatcher in handling multiple calls at the same time. In this example, the incoming message behavior policy requests that the module 204 perform the following operations in response to the call: 1) notify the software application and/or the user that a new message has been received (step 412); 2) display the message history 604; 3) display in the message history 604 the status, time, origin and/or other characteristics of the received messages, as shown in user interface 602; 3) offer options for a user to render any message in the message history 604 in a real time or time shifted mode; 4) wait for user input indicating that the new incoming message should be rendered in a real time mode (step 416); 5) continue to progressively store the new incoming call until such input is received and 6) render the newest message in a real time mode when the user input is received (steps 418 and 420.)

The methods 300/400 described in FIGS. 3 and 4 involve features related to the transmission and reception of messages, respectively. It should be appreciated that these methods may also be combined into a single method, which is executed by a single embeddable communications software module and/or a single device. That is, various embodiments of the presenting invention contemplate an embeddable communications software module that both receives incoming message behavior policy (step 302 of FIG. 3) and recipient identity information (step 402 of FIG. 4) from a software application 206 and also progressively sends, receives and stores messages as discussed in methods 300 and 400. In still other embodiments, a module 204 is arranged to perform one of the methods, but not both.

Any of the methods (e.g., methods 300 and/or 400) or features described in this application may be stored in a computer readable storage medium in the form of executable computer code. This code, when executed by a processor, then causes the module and/or device to perform the described operations. In some embodiments, this code is part of a software development kit. The software development kit is intended to be distributed to companies so that the embeddable communications software module can be embedded into their own applications. As a result, various implementations of the kit include computer code for an embeddable communications software module as previously described, but does not include a software application in which the module is embedded and that communicates with the module through the API. That is, the computer code in the kit is isolated and disconnected from a software application and is intended to be later embedded in a variety of different types of software applications.

The aforementioned methods for transmitting and receiving messages may be modified in a wide variety of ways. That is, any particular feature of the methods may be removed, modified or added. In some embodiments, for example, the module 204 progressively transmits the message as it is being created (step 412 of FIG. 4). However, the message is not necessarily progressively stored locally as it is created. Instead, it is stored at a remote location (i.e., at a server 110 and/or at the receiving device 102b.)

As discussed in the Background, some prior art approaches involve inserting code or a hyperlink that triggers the launch of a dedicated communications application.

That is, the dedicated communications applications must have been separately downloaded and installed on a device for the embedded code to access any communications features. In various embodiments of the invention, however, this is not the case. In other words, even if a dedicated application for a particular communications service does not exist on a device 104a, the embedded module 204 is able to provide access on its own to the communication service.

The present application sometimes refers to the rendering or processing of a message in a "real time mode" or a "time-shifted mode." Generally, these modes refer to a situation in which a user is creating a message (e.g., by speaking into a microphone or by recording a video clip) at a device and sending the message to a receiving device. The real time mode refers to the progressive rendering and storage of the incoming message at the receiving device as it is being received and/or created by the user. The time-shifted mode refers to the rendering of a message that has already been stored.

Although only a few embodiments of the invention have been described in detail, it should be appreciated that the invention may be implemented in many other forms without departing from the spirit or scope of the invention. For example, FIGS. 3 and 4 illustrate various steps and operations. It should be appreciated that these steps need not be performed in exactly the described order or manner Some embodiments contemplate removing, reordering, replacing or modifying one or more of the steps. For example, in method 300 of FIG. 3, step 302 could occur before, after or at the same time as step 304. Also, the present application describes various user interface designs. These features are not limited to what is expressly described herein. For example, co-assigned U.S. Pat. No. 8,321,582 (hereinafter referred to as the '582 patent), which is incorporated herein its entirety for all purposes, describes a variety of interface designs and features that may be implemented in the interfaces 500 and 600 described in FIGS. 5 and 6. Also, it should be noted that any user interface feature (e.g., as shown in FIGS. 5 and 6) described herein can be generated and/or displayed either by the embeddable communications software module 204 or the software application 206, or both. This includes any button, graphical indicator, displayed information or option that a user can interact with. In the case where the software application 206 generates the feature, the module 204 will typically transmit data (e.g., message history data, incoming call notification, etc.) to the software application, and the software application 206 will graphically display, present or arrange the data. Therefore, the present embodiments should be considered as illustrative and not restrictive and the invention is not limited to the details given herein, but may be modified within the scope and equivalents of the appended claims.

What is claimed is:

1. An embeddable communications software module that allows a software application to access a communications system providing both time delayed and near real time communication, the embeddable communications software module stored in a non-transitory tangible computer readable storage medium, wherein the embeddable communications software module is arranged to:

provide an application programming interface (API) that allows the embeddable communications software module to receive API inputs from the software application, the embeddable communication software module and the software application communicating through the API;

receive an incoming message behavior policy from the software application, wherein the incoming message behavior policy controls how the embeddable communications software module responds to incoming messages;

receive an incoming message from an remote communications device;

progressively store the incoming message as it is received;

in response to the received message, send a notification to the software application based on the incoming message behavior policy;

selectively render the incoming message in a near real time mode, wherein the near real time mode involves progressively rendering the incoming message as it is received;

selectively render the incoming message in a time-shifted mode, wherein the time shifted mode involves rendering the incoming message after the incoming message has been received and stored; and determine whether to render the incoming message in the near real time mode or the time-shifted mode based at least in part on the incoming message behavior policy, wherein the software application is separate from the communication system that is accessed through the embeddable communications software module.

2. An embeddable communications software module as recited in claim 1 wherein the embeddable communications software module is arranged to perform the progressive storage and the rendering of the incoming message in the near real time mode and the time shifted mode without any direct involvement from the software application.

3. An embeddable communications software module as recited in claim 1 wherein the embeddable communicate software module is a precompiled software program that is arranged to be inserted into one ore more software applications.

4. An embeddable communications software module as recited in claim 1 wherein the incoming message behavior policy determines at least one selected from the group consisting of: (1) whether an incoming message is automatically played in the near real time mode and (2) whether the software application is notified of particular types of incoming messages.

5. An embeddable communications software module as recited in claim 1 wherein the embeddable communications software module is further arranged to:

receive recipient identity information from the software application, the recipient identity information indicating an identity of a message recipient;

record outgoing media created by a user;

progressively transmit the outgoing media to remote device while the outgoing media is being created by the user wherein the message recipient of the outgoing media is identified by the recipient identity information received from the software application; and progressively store the outgoing media while the outgoing media is being created and transmitted.

6. An embeddable communications software module as recited in claim 5, the embeddable communication software module further arranged to:

display a talk button on a user interface provided by the software application;

obtain media created by the user in response to activation of the talk button;

progressively transmit the created media while it is being created, wherein the created media is transmitted to the message recipient identified by the recipient identity information received from the software application; and progressively store the created media in a storage unit while it being transmitted and created.

7. An embeddable communications software module as recited in claim 5, the software application being a taxi service software application, the embeddable communications software module further arranged to:

help display a dispatcher call button used to call a dispatcher, the dispatcher call button being displayed in a user interface generated by the taxi service software application; and when the dispatcher call button is activated, record outgoing media using a microphone and progressively transmit the outgoing media to a taxi dispatcher while it is being stored and recorded wherein the outgoing message is routed to the taxi dispatcher using the recipient identity information received from the taxi service software application.

8. An embeddable communications software module as recited in claim 1, the embeddable communications software module further arranged to:

receive a request from the software application for a message history, the message history indicating past incoming messages; and in response to the request, the embeddable communications software module is arranged to perform one selected from the group consisting of: (1) provide the message history to the software application and (2) display the message history on a user interface provided by the software application.

9. An embeddable communications software module as recited in claim 8, the embeddable communications software module further arranged to:

provide information identifying a sender of each message in the message history and a time at which the message was sent; and provide an option for a user to select one of the messages in the message history and render the selected one of the messages.

10. A communications device comprising:

a non-transitory computer readable storage medium that includes the embeddable communications software module as recited in claim 1; and a network interface arranged to transmit messages, wherein the embeddable communications software module is arranged to help control the network interface.

11. An embeddable communications software module as recited in claim 1 wherein the software application and the embeddable communications software module are integrated into a single mobile application that fully enables the progressive storage and rendering such that the progressive storage and renderings do not require execution of a separate client program.

12. An embeddable communications software module that allows a software application to access a communications system providing both time delayed and near real time communication, the embeddable communications software module stored in a non-transitory tangible computer readable storage medium wherein the embeddable communications software module is arranged to:

provide an application programming interface (API) that allows the embeddable communications software module to receive API inputs from the software application, the embeddable communication module and the software application communicate through the API;

receive recipient identity information from the software application, the recipient identity information indicating an identity of a message recipient;

record outgoing media created by a user;

progressively transmit the outgoing media to a remote communications device associated with the message recipient while the outgoing media is being created by the user, wherein the message recipient of the outgoing media is identified by the recipient identity information received from the software application; and progressively store the outgoing media while the outgoing media is being created and transmitted, wherein the software application is separate from the communication system that is accessed through the embeddable communications software module.

13. An embeddable communications software module as recited in claim 12, further arranged to:

display a talk button on a user interface provided by the software application, wherein user activation of the talk button triggers the recording, the transmission and the storage.

14. An embeddable communications software module as recited in claim 12 wherein the embeddable communications software module is embedded in a software application that is a taxi service software application, the embeddable communications software module further arranged to:

help display a dispatcher call button used to call a taxi dispatcher, the dispatcher call button being displayed in a user interface generated by the taxi service software application; and in response to user activation of the dispatcher call button, record the outgoing media, progressively store and progressively transmit the outgoing media to the dispatcher while the outgoing media is being recorded wherein the outgoing message is routed to the dispatcher using the recipient identity information received from the taxi service software application.

15. An embeddable communications software module as recited in claim 14 wherein the embeddable communications software module is further arranged to:

receive input indicating that the taxi dispatcher has been contacted and that a taxi will be dispatched to a user;

in response to the received input, help generate a taxi call button used to call a taxi driver, the taxi call button being displayed in the user interface generated by the taxi service software application; and in response to user activation of the taxi call button, record a message and progressively store and transmit the message to the taxi driver as it is being recorded wherein the message is routed to the taxi driver using the recipient identity information received from the taxi service software application.

16. A communications device comprising:

a non-transitory computer readable storage medium that includes the embeddable communications software module as recited in claim 12; and a network interface arranged to receive messages wherein the embeddable communications software module helps control the network interface.

* * * * *